United States Patent
Chen et al.

(10) Patent No.: US 8,988,781 B2
(45) Date of Patent: Mar. 24, 2015

(54) FOCUS-ADJUSTABLE DEVICE AND SYSTEM THEREOF

(71) Applicant: National Tsing Hua University, Hsinchu (TW)

(72) Inventors: Cheng-Huan Chen, Taoyuan (TW); Sheng-Rong Lin, New Taipei (TW)

(73) Assignee: National Tsing Hua University (TW)

( * ) Notice: Subject to any disclaimer, the term of this patent is extended or adjusted under 35 U.S.C. 154(b) by 0 days.

(21) Appl. No.: 14/138,255

(22) Filed: Dec. 23, 2013

(65) Prior Publication Data

US 2015/0029594 A1    Jan. 29, 2015

(30) Foreign Application Priority Data

Jul. 26, 2013 (TW) ............... 102126912 A

(51) Int. Cl.
*G02B 1/06* (2006.01)
*G02B 3/14* (2006.01)

(52) U.S. Cl.
CPC ....................... *G02B 3/14* (2013.01)
USPC ......................................... 359/665

(58) Field of Classification Search
CPC ....................................................... G02B 3/14
USPC .................................................. 359/666, 665
See application file for complete search history.

(56) References Cited

U.S. PATENT DOCUMENTS 7,394,598 B2 * 7/2008 Hendriks et al. .............. 359/665
7,613,388 B2 * 11/2009 Hendriks et al. ................ 396/72

\* cited by examiner

*Primary Examiner* — James Jones

(57) ABSTRACT

The present invention relates to a focus-adjustable device and a system thereof, wherein the focus-adjustable device is fabricated by forming a single closed flow channel in the internal of a transparent substrate, so as to make the substrate and the single closed flow channel together form a specific lens structure similar to the Fresnel lens. In the present invention, when a light illuminates on one side of the substrate, the light would be concentrated at a specific focus point distancing from the other side of the substrate after being deflected by the specific lens structure. Moreover, a fluid having a specific refractive index can be filled into the single closed flow channel by a flow channel opening, so as to carry out the purpose of adjusting the focus of the specific lens structure; or to make the light parallelly pass through the specific lens structure without any deflection.

10 Claims, 13 Drawing Sheets

(Prior)

(Prior)

(Prior)

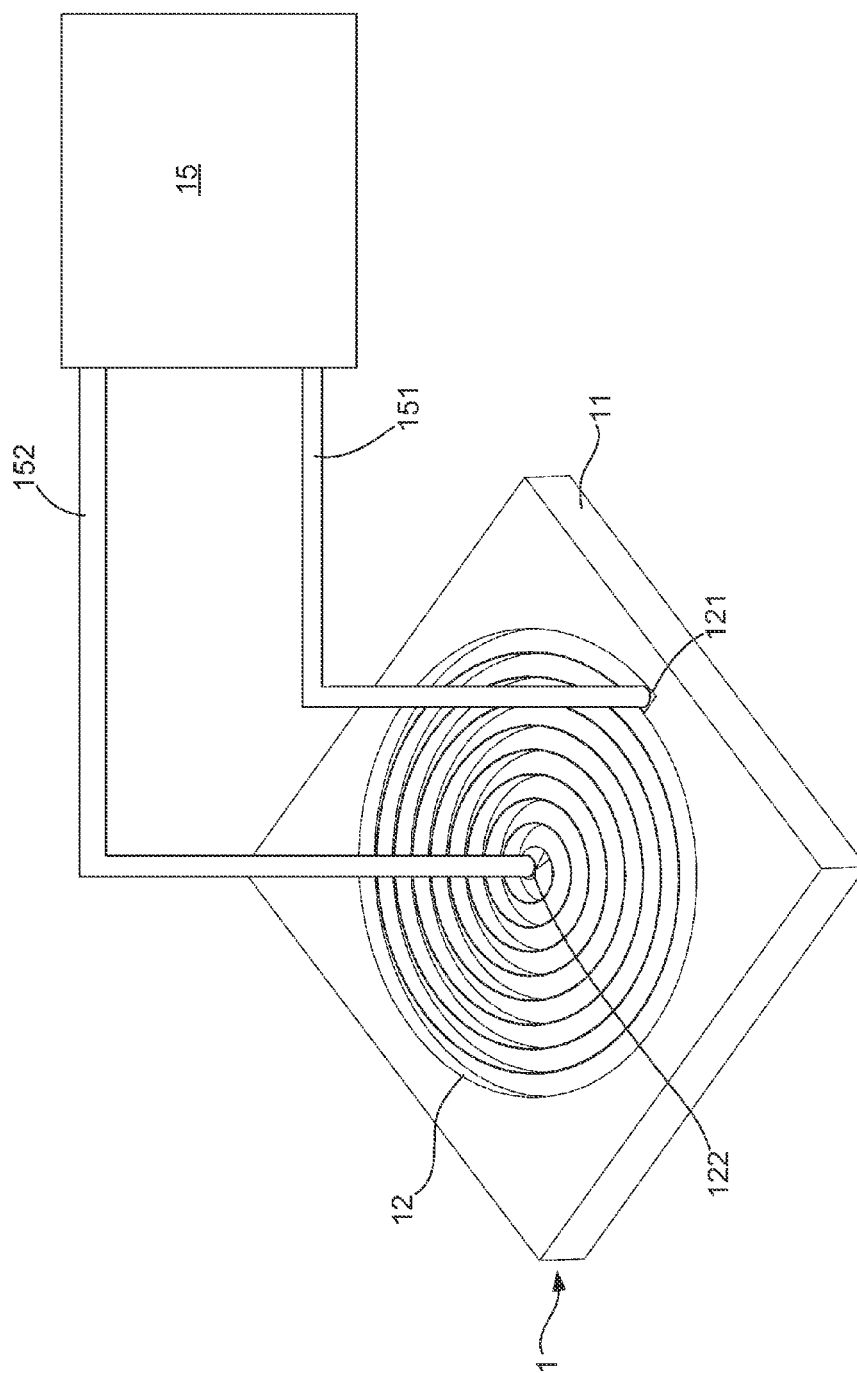

FOCUS-ADJUSTABLE DEVICE AND SYSTEM THEREOF

BACKGROUND OF THE INVENTION

1. Field of the Invention

The present invention relates to focusing optics technologies, and more particularly to a focus-adjustable device and a system thereof, in which the focus of the focus-adjustable device and the system can be changed by way of filling with a fluid having a specific refractive index.

2. Description of the Prior Art

Optics lens are widely applied in various optoelectronic equipment, for example, illumination equipment and solar power equipment. In traditional solar power equipment, some basic lens such as convex, concave or prism are used for focusing sunlight in order to increase the photoelectric conversion efficiency of the solar power equipment. Nowadays, the miniaturization of the solar power equipment is demanded for facilitating the solar power equipment able to be popularly used. For thinning the thickness of the light-focusing lens in the solar power equipment, the conventional technology is to directly make the light-focusing lens thinner, and then applied the thinned light-focusing lens in the solar power equipment. However, the thinned light-focusing lens commonly includes an un-adjustable focus, and that is the primary drawback of the thinned light-focusing lens.

Accordingly, the optics device manufacturer makes studies and then develops an improved lens called Fresnel lens. Please refer to FIG. 1, which illustrates a schematic manufacture-processing diagram of a conventional Fresnel lens. Moreover, the top view of the conventional Fresnel lens is shown in FIG. 2. As shown in FIG. 1(a), FIG. 1(b) and FIG. 2, a Fresnel lens 1' can be fabricated after making a plurality of concentric grooves 21' on the convex surface of a convex lens 2'. To see the concentric grooves 21' from one side of the Fresnel lens 1', the concentric grooves 21' are symmetric and take the center of the Fresnel lens 1' as their symmetric center.

Continuously, the side view of the Fresnel lens 1' is shown in FIG. 3. As shown in FIG. 3, when a light illuminates on one surface of the Fresnel lens 1' without forming with the concentric grooves 21', the light would pass through the Fresnel lens 1' and be deflected by the concentric grooves 21' formed on the other surface of the Fresnel lens 1', therefore the light is focused on a focus point distancing from the surface of the Fresnel lens 1' formed with the concentric grooves 21'. Comparing to the traditional convex lens, Fresnel lens 1' shows the advantages of light weight, thinner thickness, shorter focus, lower price, and having non-convex surface; so that, the Fresnel lens 1' is widely applied in the miniaturized solar power equipment by replacing the traditional convex lens.

However, when the solar power equipment is operated, it needs to control the sunlight to be largely collected through the optics lens during a light collection interval, and then the collected sunlight would be transformed into electric power by transforming modules; however, in others interval, it needs to make the sunlight pass through the optics lens unfocusedly, wherein the words of "make the sunlight pass through the optics lens unfocusedly" means that the optics lens which the sunlight passes through cannot concentrate the sunlight to a specific focus point distancing from the rear surface of the optics lens. Thus, for above descriptions, it is able to know that the Fresnel lens 1' of FIG. 2 still cannot meet the operation requirement of the solar power equipment because the Fresnel lens 1' including an un-adjustable focus and the sunlight would surely be concentrated at a focus point when passing through the Fresnel lens 1'.

Thus, through above descriptions, it is able to know that conventional optics lens and the Fresnel lens still includes drawbacks and shortcomings, so that the inventor of the present application has made great efforts to make inventive research thereon and eventually provided a focus-adjustable device and a system thereof.

SUMMARY OF THE INVENTION

The first objective of the present invention is to provide a focus-adjustable device, which is fabricated by forming a single closed flow channel in the internal of a transparent substrate, and then the substrate and the single closed flow channel together form a specific lens structure similar to the Fresnel lens; therefore, a fluid having a specific refractive index can be filled into the single closed flow channel through a flow channel opening, so as to carry out the purpose of adjusting the focus of the focus-adjustable device; or, to make the light illuminating on one side of the substrate able to parallelly pass through the specific lens structure without any deflection. Moreover, after the filled fluid is pumped out of the single closed flow channel via the flow channel opening, meanwhile, when a light illuminates on one side of the substrate, the light would be concentrated at a specific focus point distancing from the other side of the substrate after being deflected by the specific lens structure constituted by the substrate and the single closed flow channel. So that, the focused light can be further guided to a sunlight collecting plate of a solar power equipment for being transformed into electric power; in addition, the focused light can also be guided to a sunlight collecting plate of a heating pipe for being transformed into thermal power; moreover, the focused light can also be guided to a building space for illumination.

Inheriting to above description, moreover, after the fluid having the specific refractive index the same to the refractive index of the substrate is filled into the single closed flow channel, the light illuminating on one side of the substrate would parallelly pass through the specific lens structure without any deflection, therefore the light passed through the substrate would illuminate the light collection space under the substrate liking the natural light. Moreover, if the refractive index of the filled fluid is different from the refractive index of the substrate, the focus of the focus-adjustable device may change according to the refractive index difference of the fluid's refractive index and the substrate's refractive index.

Accordingly, to achieve the above-mentioned first objective of the present invention, the inventors propose a focus-adjustable device, comprising:

a substrate, made of a transparent material;

a single closed flow channel, formed in the internal of the substrate and having a first flow channel opening and a second flow channel opening, wherein when a light illuminates on one side of the substrate, the light would be concentrated at a specific focus point distancing from the other side of the substrate after being deflected by a specific lens structure constituted by the substrate and the single closed flow channel;

wherein after a fluid having a specific refractive index the same to the refractive index of the substrate is filled into the single closed flow channel via the first flow channel opening or the second flow channel opening, the light illuminating on one side of the substrate would parallelly pass through the specific lens structure without any deflection due to the index matching of the single closed flow channel and the substrate.

The second objective of the present invention is to provide a focus-adjustable system, which is constituted by aforesaid focus-adjustable device and a fluid filling and pumping device, wherein the fluid filling and pumping device is connected with the flow channel of the single closed flow channel in the focus-adjustable device. So that, by operating the fluid filling and pumping device, the fluid can be easily filled into the single closed flow channel through the flow channel; on the contrary, the fluid can also be pumped out of the single closed flow channel through the flow channel by using the fluid filling and pumping device. Therefore, through the fluid filling and fluid pumping operations, it is able to control the position of the fluid in the single closed flow channel, so as to make one part of the focus-adjustable device focus the light illuminating on the substrate and the other part of the focus-adjustable device unfocuses the light at the same time.

Accordingly, to achieve the above-mentioned second objective of the present invention, the inventors propose a focus-adjustable system, comprising:

a focus-adjustable device, comprising: a substrate, made of a transparent material; and a single closed flow channel, formed in the internal of the substrate and having a first flow channel opening and a second flow channel opening, wherein when a light illuminates on one side of the substrate, the light would be concentrated at a specific focus point distancing from the other side of the substrate after being deflected by a specific lens structure constituted by the substrate and the single closed flow channel; and a fluid filling and pumping device, connected with the first flow channel opening and the second flow channel opening, used for filling a fluid having a specific refractive index into the single closed flow channel via the first flow channel opening or the second flow channel opening; moreover, the fluid filling and pumping device can also pump the fluid out of the single closed flow channel via the first flow channel opening or the second flow channel opening;

wherein after the fluid having the specific refractive index the same to the refractive index of the substrate is filled into the single closed flow channel via the first flow channel opening or the second flow channel opening, the light illuminating on one side of the substrate would parallelly pass through the specific lens structure without any deflection due to the index matching of the single closed flow channel and the substrate.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein:

FIG. 9 is a framework diagram of a focus-adjustable system according to the present invention.

DETAILED DESCRIPTION OF THE PREFERRED EMBODIMENTS

To more clearly describe a focus-adjustable device and a system thereof according to the present invention, embodiments of the present invention will be described in detail with reference to the attached drawings hereinafter.

Figure 1:
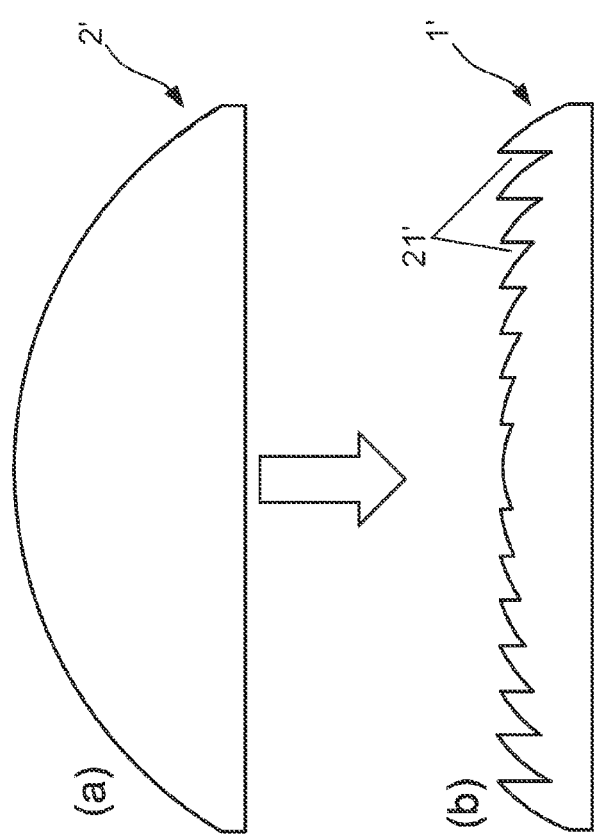
FIG. 1 is a schematic manufacture-processing diagram of a conventional Fresnel lens.
Figure 2:
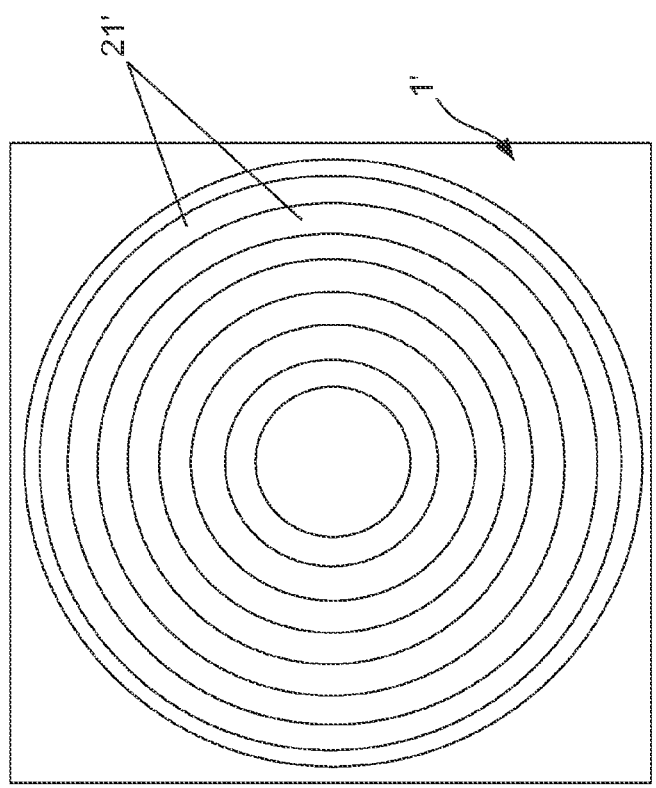
FIG. 2 is a top view of the conventional Fresnel lens.
Figure 3:
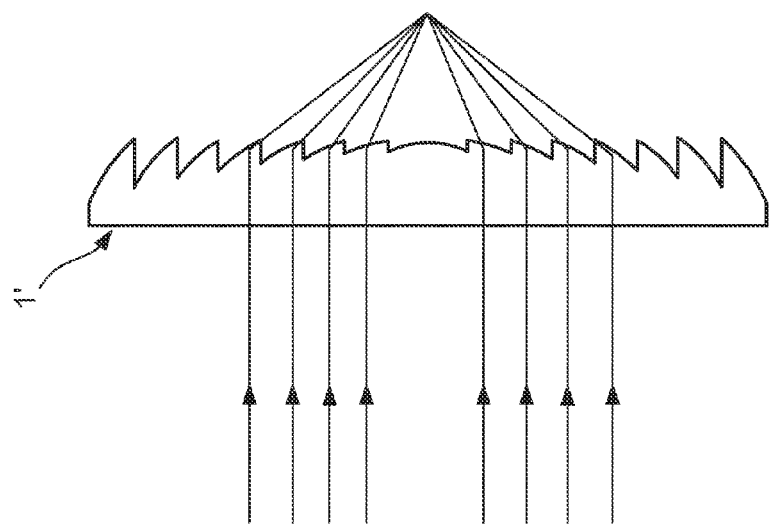
FIG. 3 is a side view of the conventional Fresnel lens.
Figure 4:
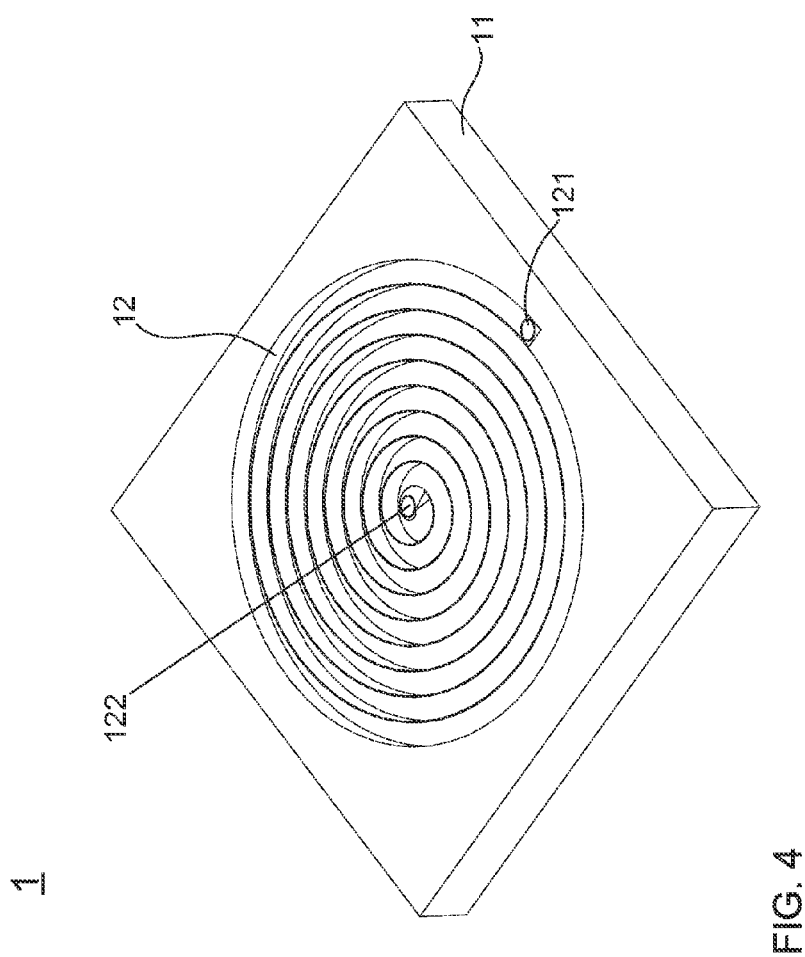
FIG. 4 is a stereo view of a focus-adjustable device according to the present invention.
Figure 5A:
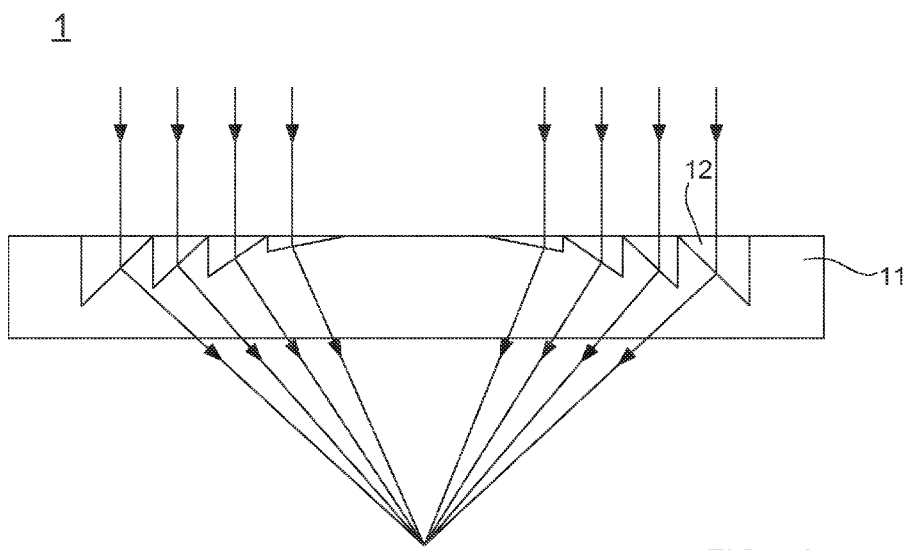
FIGS. 5A and 5B are side views of the focus-adjustable device according to the present invention.
Figure 5B:
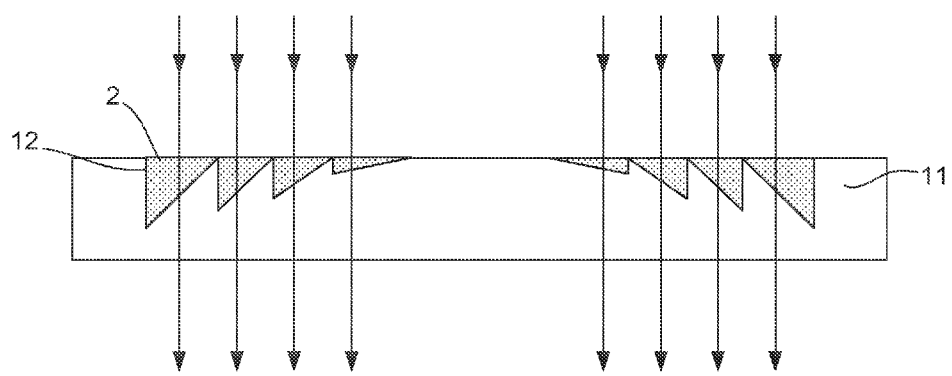

Referring to FIG. 4, which illustrates a stereo view of a focus-adjustable device according to the present invention; moreover, two side views of the focus-adjustable device are shown in FIG. 5A and FIG. 5B. As shown in FIG. 4 and FIG. 5A, the focus-adjustable device 1 of the present invention consists of a substrate 11 and a single closed flow channel 12, wherein substrate 11 is made of a transparent material, for example, plastics, transparent resin or glass. The single closed flow channel 12 is formed in the internal of the substrate 11 and having a first flow channel opening 121 and a second flow channel opening 122. In the present invention, when a light illuminates on one side of the substrate 11, the light would be concentrated at a specific focus point f distancing from the other side of the substrate 11 after being deflected by a specific lens structure constituted by the substrate 11 and the single closed flow channel 12. Herein the specific lens structure is similar to the structure of the Fresnel lens. Moreover, although the first flow channel opening 121 and the second flow channel opening 122 drawn in FIG. 4 are respectively located on the peripheral and the center of the substrate 11, that does not limit the exemplary design of the first flow channel opening 121 and the second flow channel opening 122. In different exemplary designs, both the first flow channel opening 121 and the second flow channel opening 122 can be disposed on the two different edges of the substrate 11; of course, the first flow channel opening 121 and the second flow channel opening 122 can also be disposed on the identical edges of the substrate 11.

As shown in FIG. 5A, because the substrate 11 and the single closed flow channel 12 together form a specific lens structure similar to the Fresnel lens, the light illuminating on one side of the substrate 11 would be concentrated at a specific focus point f distancing from the other side of the substrate 11 after being deflected by the specific lens structure. Oppositely, as shown in FIG. 5B, after a fluid 2 having a specific refractive index the same to the refractive index of the substrate 11 is filled into the single closed flow channel 12 via the first flow channel opening 121 or the second flow channel opening 122, the light illuminating on one side of the substrate 11 would parallelly pass through the specific lens structure without any deflection due to the index matching of the single closed flow channel 12 and the substrate 11.

Figure 6:
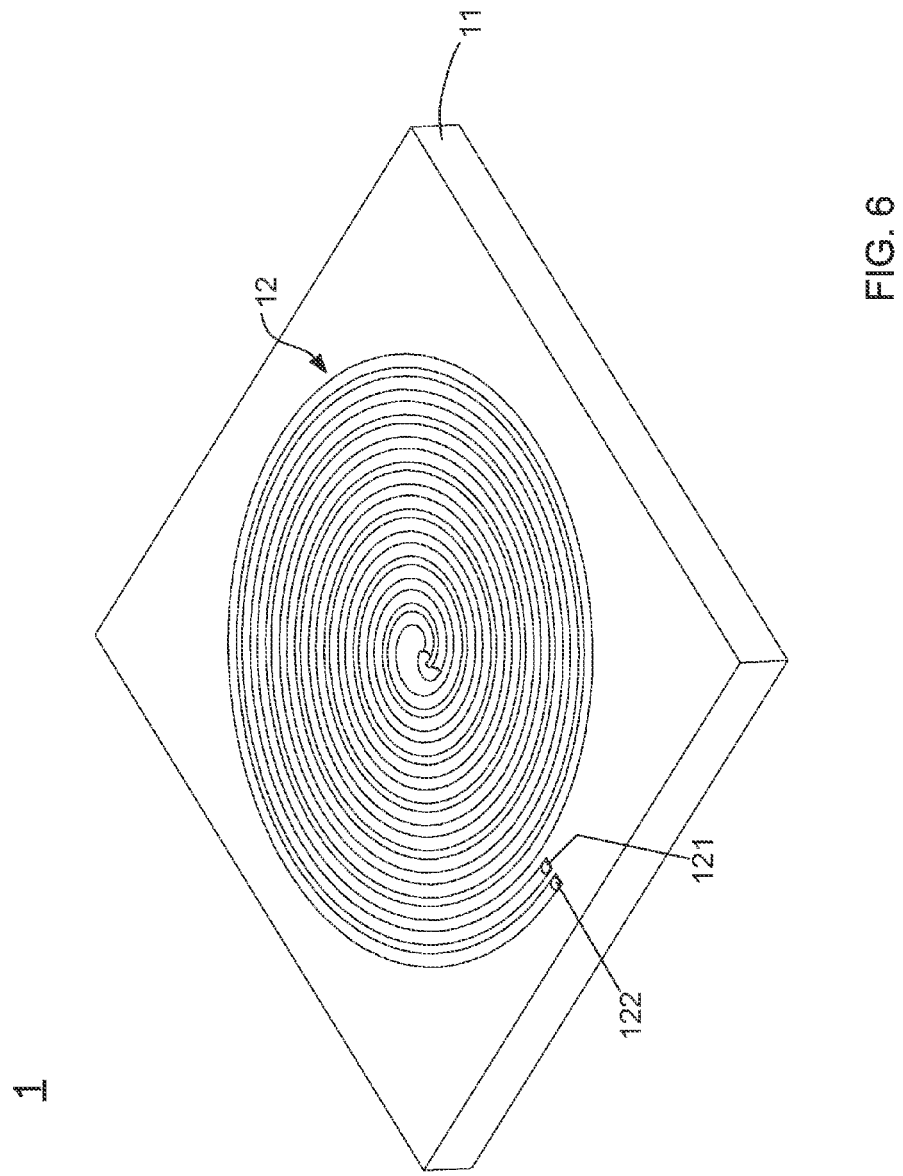
FIG. 6 is a stereo view of a second exemplary embodiment of a single closed flow channel in the focus-adjustable device.
Figure 7:
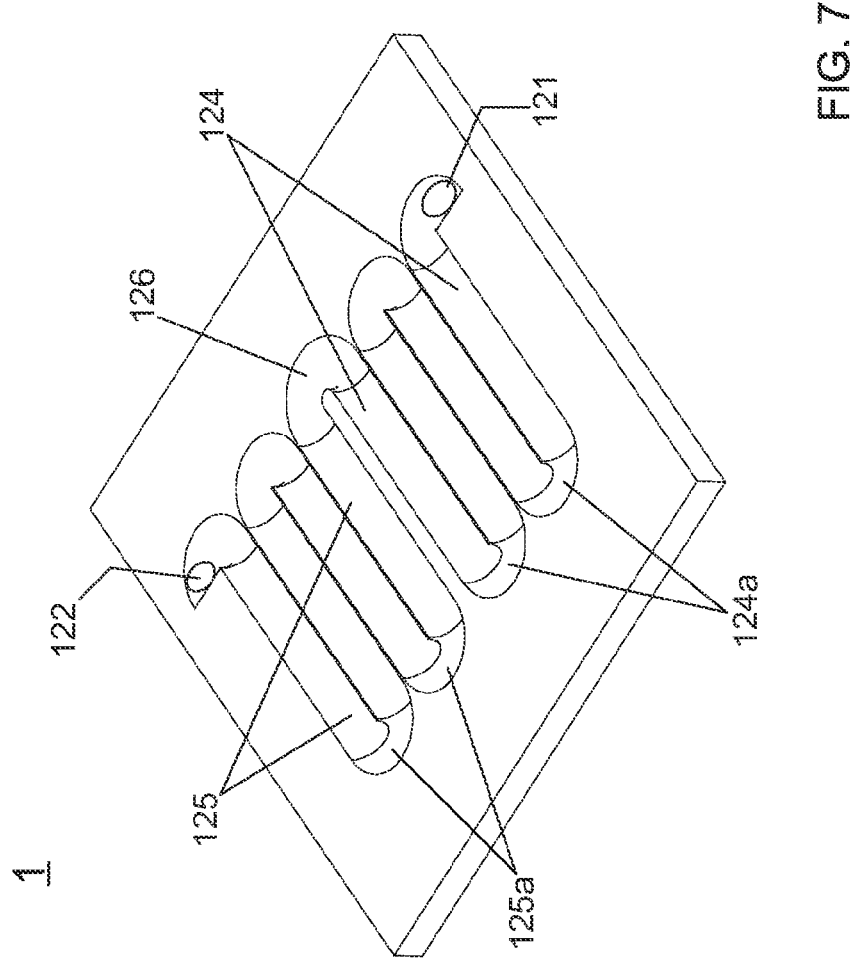
FIG. 7 is a stereo view of a third exemplary embodiment of the single closed flow channel in the focus-adjustable device.

Herein, it needs to further explain that, although the appearance of the single closed flow channel 12 drawn in FIG. 4 is spiral, the spiral does not used for limiting the exemplary shape of the single closed flow channel 12. Please refer to FIG. 6 and FIG. 7, in which a second exemplary embodiment and a third exemplary embodiment of the single closed flow channel are drawn. As shown in FIG. 6, the appearance of the single closed flow channel 12 can be designed to a double spiral, wherein the first flow channel opening 121 or the second flow channel opening 122 can be designed to locate on the peripheral and the center of the substrate 11. Moreover, as shown in FIG. 7, the single closed flow channel 12 can also be constituted by a first closed flow channel array 124 and second closed flow channel array 125. In the first closed flow channel array 124, any two flow channels are closely joined to each other, and one of the any two flow channels is connected with the other one through a first connection flow channel 124a. Similarly, in the second closed flow channel array 125, any two flow channels are closely joined to each other, and one of the any two flow channels is connected with the other one through a second connection flow channel 125a. Particularly, the second closed flow channel array 125 is distanced from the first closed flow channel array 124 by a specific distance, and the second closed flow channel array 125 is connected with the first closed flow channel array 124 through a third connection flow channel 126. Therefore, by the special design of the third exemplary embodiment of the single closed flow channel 12, the first closed flow channel array 124, the second closed flow channel array 125 and the substrate 11 are together form a specific lens structure similar to the Fresnel lens, such that the light illuminating on one side of the substrate 11 would be concentrated to a focused light on a specific focus plane distancing from the other side of the substrate 11 after being deflected by aforesaid specific lens structure.

Moreover, it needs to further explain that, the aforesaid specific structure used for deflecting light does not include the first connection flow channel 124*a*, the second connection flow channel 125*a* and the third connection flow channel 126 because these connection flow channels cannot form the specific structure liking the Fresnel lens with the substrate 11. So that, these connection flow channels are merely used for connecting the plurality of flow channels of the first closed flow channel array 124 with each other, and connecting the plurality of flow channels of the second closed flow channel array 125 with each other, so as to form the single closed flow channel 12 in the internal of the substrate 11.

Figure 8A:
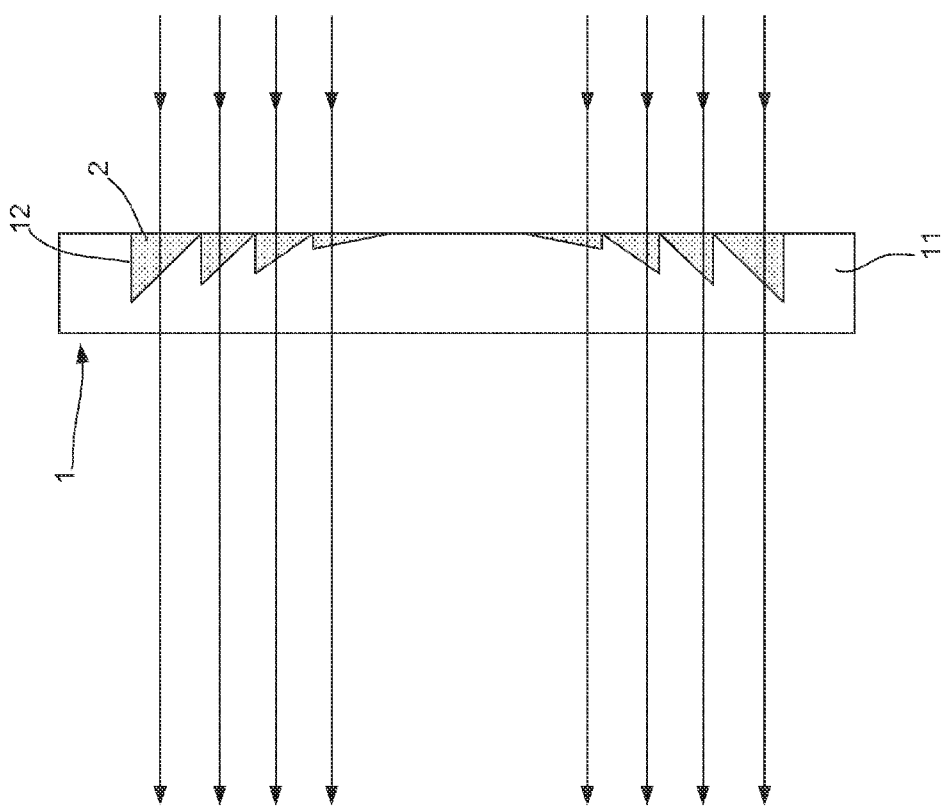
FIGS. 8A, 8B, 8C, 8D, and 8E are schematic operation diagrams of the focus-adjustable device.
Figure 8B:
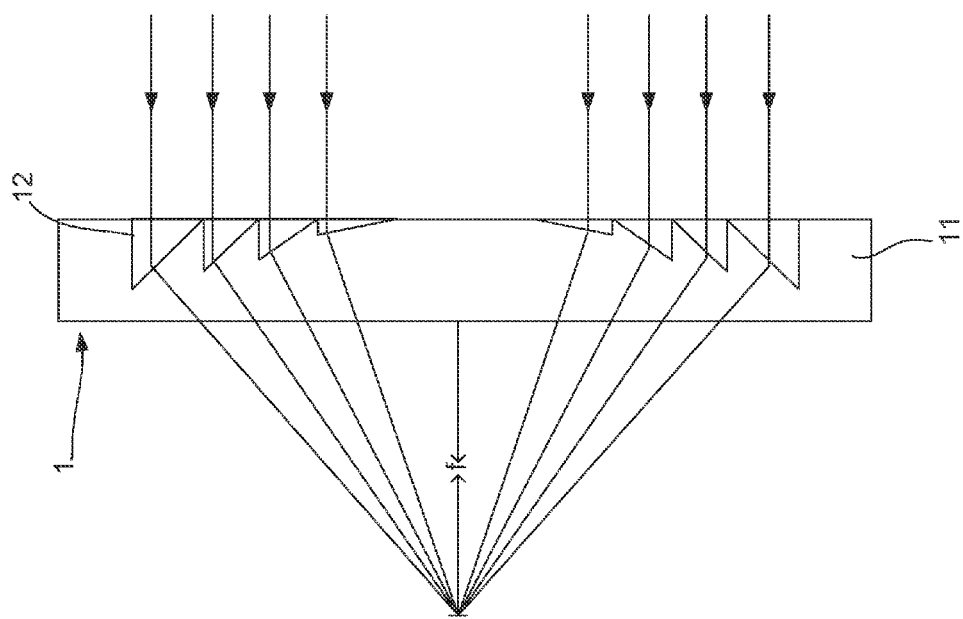

Thus, through the descriptions, the focus-adjustable device 1 of the present invention has been introduced completely and clearly; next, the technology feature of the focus-adjustable device 1 will be described through schematic operation diagrams shown in FIGS. 8A, 8B, 8C, 8D, and 8E. In FIG. 8A, the single closed flow channel 12 is filled with and full of the fluid 2 having the refractive index the same to the refractive index of the substrate 11; thus, when a light illuminating on one side of the substrate 11, the light would pass through the specific lens structure constituted by the single closed flow channel 12 and the substrate 11 without any deflection due to the index matching of the single closed flow channel 12 and the substrate 11. On the contrary, as shown in FIG. 8B, after the fluid 2 is pumped out of the single closed flow channel 12, the light illuminating on one side of the substrate 11 would be concentrated at a specific focus point f distancing from the other side of the substrate 11 after being deflected by the specific lens structure constituted by the substrate 11 and the single closed flow channel 12.

Figure 8C:
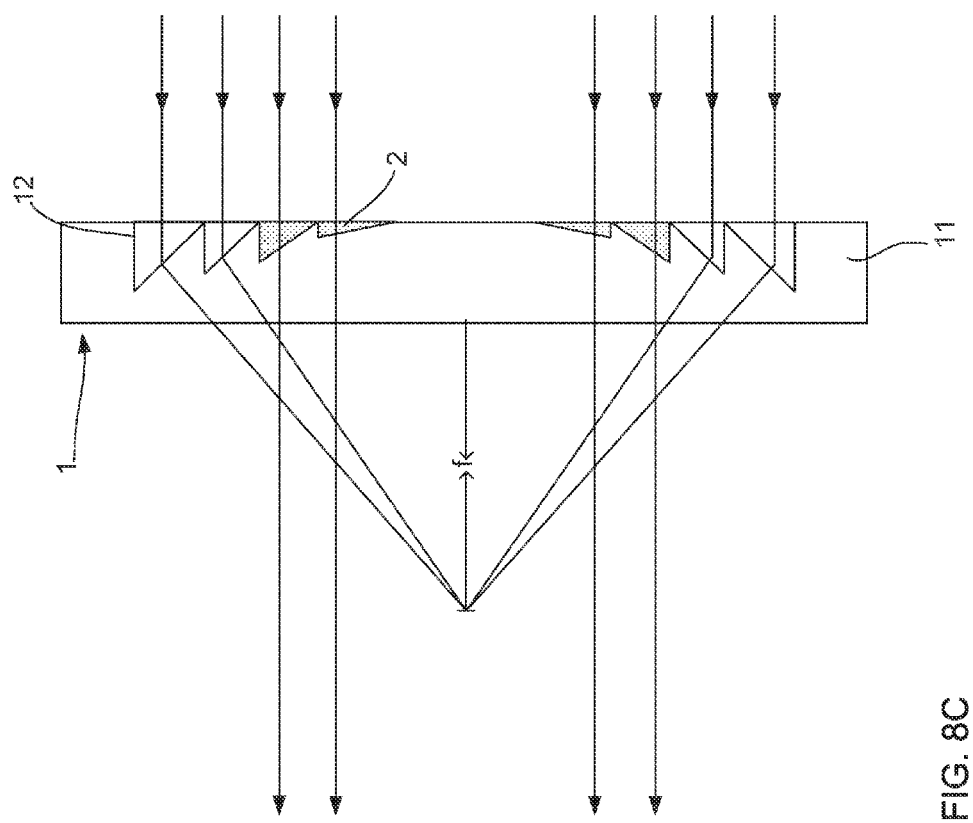
Figure 8D:
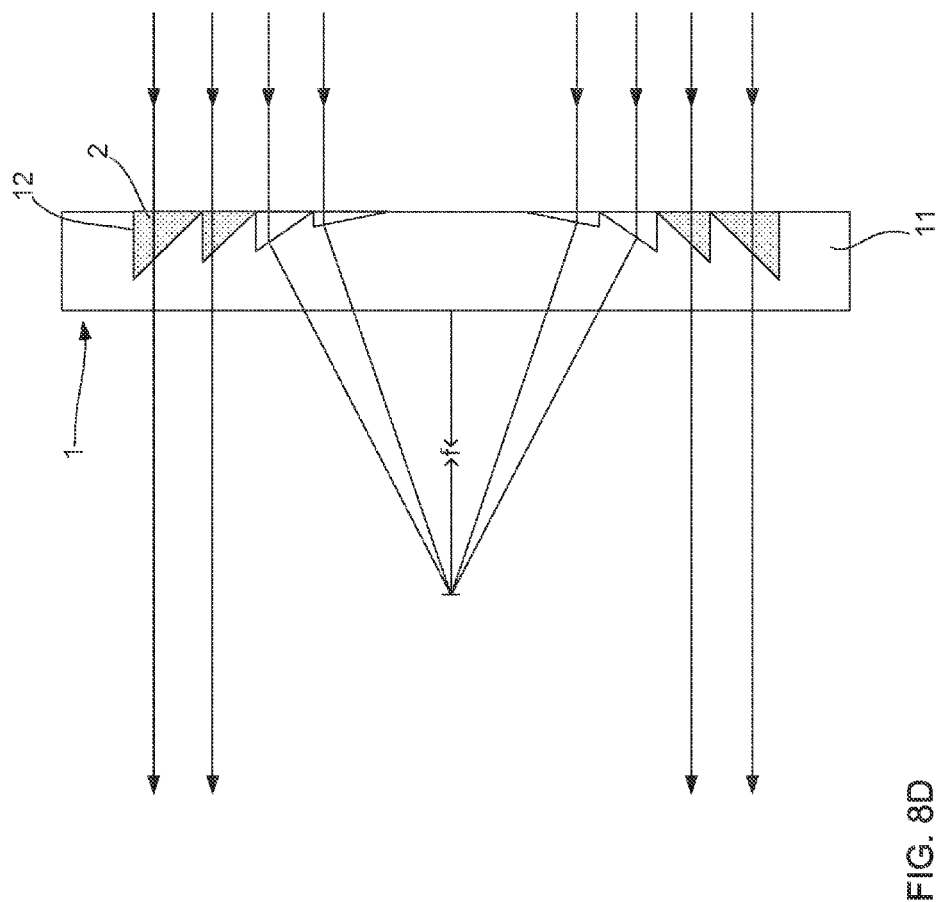

Particularly, as shown in FIG. 8C, the filled fluid 2 can be controlled to merely distribute around the center of the substrate 11, such that the light illuminating on one side of the center of the substrate 11 would parallelly pass through the specific lens structure without any deflection due to the index matching of the single closed flow channel 12 and the substrate 11; moreover, the light illuminating on one side of the peripheral of the substrate 11 would be concentrated at the specific focus point f distancing from the other side of the substrate 11 after being deflected by the specific lens structure constituted by the substrate 11 and the single closed flow channel 12. Opposite to the operation diagram of FIG. 8C, the filled fluid 2 shown in FIG. 8D can also be controlled to merely distribute around the peripheral of the substrate 11; thus, the light illuminating on one side of the peripheral of the substrate 11 would parallelly pass through the specific lens structure without any deflection due to the index matching of the single closed flow channel 12 and the substrate 11; moreover, the light illuminating on one side of the center of the substrate 11 would be concentrated at the specific focus point f distancing from the other side of the substrate 11 after being deflected by the specific lens structure constituted by the substrate 11 and the single closed flow channel 12.

Figure 8E:
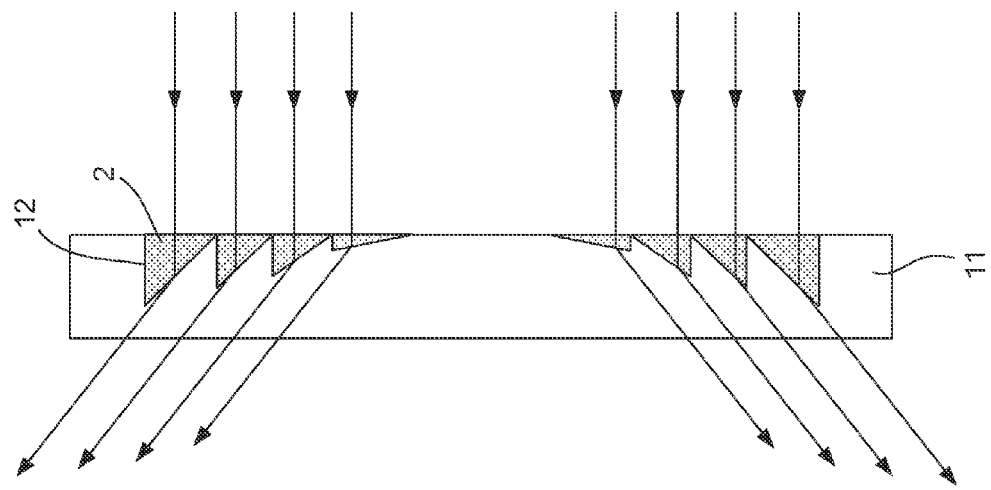

In addition, as shown in FIG. 8E, if the refractive index of the filled fluid 2 is greater than the refractive index of the substrate 11, the light illuminating on one side the substrate 11 would be diverged from the other side of the substrate 11. Furthermore, as shown in FIG. 8F, if the refractive index of the filled fluid 2 is less than the refractive index of the substrate 11, the light illuminating on one side of the substrate 11 would be concentrated at a second focus point f' distancing from the other side of the substrate 11 after being deflected by the specific lens structure constituted by the substrate 11 and the single closed flow channel 12, wherein the focus value of the second focus point f' is greater the focus value of the above-mentioned focus point f.

To further explain the technology of the focus-adjustable device 1 proposed by the present invention, for this focus-adjustable device 1, it is able to modulate the focus (or the focus point f) of the focus-adjustable device 1 by way of filling the fluids with different refractive index into the single closed flow channel 12. Moreover, for diversified application, the fluid 2 filled in the single closed flow channel 12 can be doped with color powder for making the fluid 2 become a monochrome fluid or a color fluid; of course, the native fluid is a transparent fluid. Therefore, if the light illuminating on the substrate 11 passes through the single closed flow channel 12 full of a red fluid 2, the light would become a red light; so that, it is able to increase the applications of the focus-adjustable device 1 by such way.

Thus, through above descriptions, the focus-adjustable device of the present invention has been clearly and completely described; in summary, the present invention includes the advantages of:

(1) In the present invention, it fabricates a focus-adjustable device 1 by forming a single closed flow channel 12 in the internal of a transparent substrate 11, such that the substrate 11 and the single closed flow channel 12 together form a specific lens structure similar to the Fresnel lens; therefore, a fluid 2 having a specific refractive index can be filled into the single closed flow channel 12 through a flow channel opening, so as to carry out the purpose of adjusting the focus (or the focus point f) of the focus-adjustable device; or, to make the light illuminating on one side of the substrate 11 able to parallelly pass through the specific lens structure constituted by the substrate 11 and the single closed flow channel 12 without any deflection. Moreover, after the filled fluid 2 is pumped out of the single closed flow channel 12; meanwhile, when a light illuminates on one side of the substrate 11, the light would be concentrated at a specific focus point f distancing from the other side of the substrate 11 after being deflected by the specific lens structure constituted by the substrate 11 and the single closed flow channel 12; so that, the focused light can be further guided to a sunlight collecting plate of a solar power equipment for being transformed into electric power; besides, the focused light can also be guided to a sunlight collecting plate of a heating pipe for being transformed into thermal power; moreover, the focused light can also be guided to a building space for illumination.

(2) Inheriting to above point 1, moreover, after the fluid 2 having the specific refractive index the same to the refractive index of the substrate 11 is filled into the single closed flow channel 12, the light illuminating on one side of the substrate 11 would parallelly pass through the specific lens structure without any deflection, therefore the light passed through the substrate 11 would illuminate the light collection space under the substrate 11 liking the natural light. Moreover, if the refractive index of the filled fluid 2 is different from the refractive index of the substrate 11, the focus of the focus-adjustable device 1 may change according to the refractive index difference of the fluid's refractive index and the substrate's refractive index.

(3) Furthermore, in the present invention, it is able to control the position of the fluid 2 in the single closed flow channel 12, for example, to control the filled fluid 2 merely distribute around the peripheral of the substrate 11, or control the filled fluid 2 merely distribute around the center of the substrate 11; thus, it is able to make one part of the focus-adjustable device 1 able to focus the light illuminating on the substrate 11 and the other part of the focus-adjustable device 1 unfocus the light at the same time.

The present invention further introduces a focus-adjustable system. Please refer to FIG. 9, which illustrates the framework diagram of the focus-adjustable system. As shown in FIG. 9, the focus-adjustable system consists of the focus-adjustable device 1 and a fluid filling and pumping device 15, wherein the fluid filling and pumping device 15 is connected with the first flow channel opening 121 and the second flow channel opening 122 of the focus-adjustable device 1. In the present invention, the fluid filling and pumping device 15 is used for filling the fluid 2 into the single closed flow channel 12 via the first flow channel opening 121 or the second flow channel opening 121; moreover, the fluid filling and pumping device 15 can also pump the fluid 2 out of the single closed flow channel 12 via the first flow channel opening 121 or the second flow channel opening 122.

Therefore, it can control the position of the fluid 2 in the single closed flow channel by operating the fluid filling and pumping device 15, such that the effect of making one part of the focus-adjustable device focus the light illuminating on the substrate and the other part of the focus-adjustable device unfocuses the light can be carried out so easily.

The above description is made on embodiments of the present invention. However, the embodiments are not intended to limit scope of the present invention, and all equivalent implementations or alterations within the spirit of the present invention still fall within the scope of the present invention.

What is claimed is:

1. A focus-adjustable device, comprising:
    a substrate, being made of a transparent material;
    a single closed flow channel, being formed in the internal of the substrate and having a first flow channel opening and a second flow channel opening, wherein when a light illuminates on one side of the substrate, the light would be concentrated at a specific focus point distancing from the other side of the substrate after being deflected by a specific lens structure constituted by the substrate and the single closed flow channel;
    wherein when a light illuminates on one side of the substrate, the light would be concentrated at a specific focus point distancing from the other side of the substrate after being deflected by a specific lens structure constituted by the substrate and the single closed flow channel;
    wherein after a fluid having a specific refractive index the same to the refractive index of the substrate is filled into the single closed flow channel via the first flow channel opening or the second flow channel opening, the filled fluid can be further controlled to merely distribute around the center of the substrate, such that the light illuminating on one side of the center of the substrate would parallelly pass through the specific lens structure without any deflection due to the index matching of the single closed flow channel and the substrate; moreover, the light illuminating on one side of the peripheral of the substrate would be concentrated at the specific focus point distancing from the other side of the substrate after being deflected by the specific lens structure;
    wherein after the fluid is controlled to merely distribute around the peripheral of the substrate, the light illuminating on one side of the peripheral of the substrate would parallelly pass through the specific lens structure without any deflection due to the index matching of the single closed flow channel and the substrate; moreover, the light illuminating on one side of the center of the substrate would be concentrated at the specific focus point distancing from the other side of the substrate after being deflected by the specific lens structure.

2. The focus-adjustable device of claim 1, wherein the appearance of the single closed flow channel is selected from the group consisting of: spiral and double spiral.

3. The focus-adjustable device of claim 1, wherein the single closed flow channel comprises:
    a first closed flow channel array, wherein any two flow channels in the first closed flow channel array are closely joined to each other, and one of the any two flow channels being connected with the other one through a first connection flow channel; and
    a second closed flow channel array, wherein any two flow channels in the second closed flow channel array are closely joined to each other, and one of the any two flow channels being connected with the other one through a second connection flow channel; moreover, the second closed flow channel array being distanced from the first closed flow channel array by a specific distance, and the second closed flow channel array being connected with the first closed flow channel array through a third connection flow channel;
    wherein the specific lens structure constituted by the first closed flow channel array and the second closed flow channel array being similar to the Fresnel lens, such that the light illuminating on one side of the substrate would be concentrated to a focused light on a specific focus plane distancing from the other side of the substrate after being deflected by aforesaid specific lens structure.

4. The focus-adjustable device of claim 1, wherein the transparent material is selected from the group consisting of: plastics, transparent resin and glass.

5. The focus-adjustable device of claim 1, wherein the fluid is selected from the group consisting of: transparent fluid, monochrome fluid and color fluid.

6. A focus-adjustable system, comprising:
    a focus-adjustable device, comprising;
        a substrate, being made of a transparent material; and
        a single closed flow channel, being formed in the internal of the substrate and having a first flow channel opening and a second flow channel opening, wherein when a light illuminates on one side of the substrate, the light would be concentrated at a specific focus point distancing from the other side of the substrate after being deflected by a specific lens structure constituted by the substrate and the single closed flow channel; and
    a fluid filling and pumping device, being connected with the first flow channel opening and the second flow channel opening, used for filling a fluid having a specific refractive index into the single closed flow channel via the first flow channel opening or the second flow channel opening; moreover, the fluid filling and pumping device can also pump the fluid out of the single closed flow channel via the first flow channel opening or the second flow channel opening;

wherein after the fluid having the specific refractive index the same to the refractive index of the substrate is filled into the single closed flow channel via the first flow channel opening or the second flow channel opening, the filled fluid can be further controlled to merely distribute around the center of the substrate, such that the light illuminating on one side of the center of the substrate would parallelly pass through the specific lens structure without any deflection due to the index matching of the single closed flow channel and the substrate; moreover, the light illuminating on one side of the peripheral of the substrate would be concentrated at the specific focus point distancing from the other side of the substrate after being deflected by the specific lens structure;

wherein after the fluid is controlled to merely distribute around the peripheral of the substrate, the light illuminating on one side of the peripheral of the substrate would parallelly pass through the specific lens structure without any deflection due to the index matching of the single closed flow channel and the substrate; moreover, the light illuminating on one side of the center of the substrate would be concentrated at the specific focus point distancing from the other side of the substrate after being deflected by the specific lens structure.

7. The focus-adjustable system of claim 6, wherein the appearance of the single closed flow channel is selected from the group consisting of: spiral and double spiral.

8. The focus-adjustable system of claim 6, wherein the single closed flow channel comprises:

a first closed flow channel array, wherein any two flow channels in the first closed flow channel array are closely joined to each other, and one of the any two flow channels being connected with the other one through a first connection flow channel; and a second closed flow channel array, wherein any two flow channels in the second closed flow channel array are closely joined to each other, and one of the any two flow channels being connected with the other one through a second connection flow channel; moreover, the second closed flow channel array being distanced from the first closed flow channel array by a specific distance, and the second closed flow channel array being connected with the first closed flow channel array through a third connection flow channel;

wherein the specific lens structure constituted by the first closed flow channel array and the second closed flow channel array being similar to the Fresnel lens, such that the light illuminating on one side of the substrate would be concentrated to a focused light on a specific focus plane distancing from the other side of the substrate after being deflected by aforesaid specific lens structure.

9. The focus-adjustable system of claim 6, wherein the transparent material is selected from the group consisting of: plastics, transparent resin and glass.

10. The focus-adjustable system of claim 6, wherein the fluid is selected from the group consisting of: transparent fluid, monochrome fluid and color fluid.

\* \* \* \* \*